United States Patent
Batra et al.

(10) Patent No.: US 10,885,683 B1
(45) Date of Patent: Jan. 5, 2021

(54) DETECTING SALIENT GEOMETRIC CONSTRUCTS FROM RASTER REPRESENTATIONS OF SKETCHES

(71) Applicant: Adobe Inc., San Jose, CA (US)

(72) Inventors: Vineet Batra, Pitam Pura (IN); Matthew David Fisher, San Carlos, CA (US); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/534,831

(22) Filed: Aug. 7, 2019

(51) Int. Cl.
*G06T 11/20* (2006.01)
*G06T 11/60* (2006.01)
*G06T 11/00* (2006.01)

(52) U.S. Cl.
CPC .......... *G06T 11/203* (2013.01); *G06T 11/001* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 8,411,080 B1* | 4/2013 | Zimmermann | ......... | G06T 17/20 345/419 |
| 9,142,056 B1* | 9/2015 | Baran | ..................... | G09G 5/026 |
| 2013/0127869 A1* | 5/2013 | Winnemoeller | ...... | G06T 11/203 345/441 |
| 2018/0293721 A1* | 10/2018 | Gupta | .............. | G05B 19/41875 |

OTHER PUBLICATIONS

Cohen-Steiner,"Variational Shape Approximation", In SIGGRAPH '04: ACM SIGGRAPH 2004 Papers, ACM, New York, NY, USA, Aug. 1, 2004, pp. 905-914.
Duda,"Use of the Hough Transformation to Detect Lines and Curves in Pictures", Technical Note 36, Published in the Comm. ACM, vol. 15, No. 1, Jan. 1972, 18 pages.
Jan,"Shape Similarity Measure Based on Correspondence of Visual Parts", IEEE Transactions on Pattern Analysis and Machine Intelligence, vol. 22, No. 10, Oct. 2000, pp. 1185-1190.
Patraucean,"A Parameterless Line Segment and Elliptical Arc Detector with Enhanced Ellipse Fitting", Oct. 7, 2012, 14 pages.

* cited by examiner

*Primary Examiner* — Michelle Chin
(74) *Attorney, Agent, or Firm* — SBMC

(57) ABSTRACT

A vector representation of a sketch is generated from a raster representation of the sketch. The vector representation is an abstraction of the sketch that captures the intent or desire of the user rather than a faithful reconstruction of what the user actually drew. A sketch includes one or more components. For each component, pixels of the component are clustered into multiple proxies. The multiple proxies are merged together based on their similarities and proximity to each other, resulting in a set of merged proxies. For each component, pixels within each of the merged proxies as well as merged proxies within the component are sorted into a natural drawing order. A set of geometric constructs representing the sketch are then generated by fitting one or more geometric constructs (e.g., circular arcs and line segments) onto the merged proxies.

20 Claims, 10 Drawing Sheets

DETECTING SALIENT GEOMETRIC CONSTRUCTS FROM RASTER REPRESENTATIONS OF SKETCHES

BACKGROUND

As computer technology has advanced computers have become increasingly commonplace in our lives and have found a wide variety of different uses. One such use is creating and editing digital content, where users can generate and edit digital content in a variety of different manners. One way in which users desire to create and edit digital content is based on a sketch of the digital content, such as a hand-drawn pencil sketch of the digital content the user desires. The user then captures an image of the sketch (e.g., with a scanner or digital camera), which makes a raster representation of the sketch available on the user's computing device.

While the ability to have a raster representation of a sketch available on the user's computing device is useful, it is not without its problems. These problems include raster representations oftentimes not scaling well, and raster representations being difficult to use with other digital content creation and editing techniques (e.g., techniques to color lines, techniques to fill shapes with a particular color). Accordingly, users oftentimes desire to convert the raster representation of an image to a vector representation of the image.

Conventional techniques for generating a vector representation of an image from a raster representation of an image typically generate a faithful vector representation of the raster representation. Unfortunately, a faithful vector representation is oftentimes not the vector representation that the user desires because it reflects what was actually drawn in the sketch in contrast to what the user desires the sketch to look like. For example, the user may attempt to draw a circle as part of the sketch, however a hand-drawn circle is typically not an exact circle (e.g., it will have some flat parts, it will have some parts that are arcs of a different radius than other parts, it may have points or vertices where two lines of the sketch intersect). In this example, what the user desires is a vector representation of a circle, not a vector representation of the sketch that accurately depicts the flat parts of the sketched circle, the arcs of the sketched circle that have different radii, the points or vertices where two lines of the sketched circle interest, and so forth.

Accordingly, conventional digital content creation and editing programs generate a vector representation of a user's sketch that is a faithful representation of the user's sketch, but is not what the user really desires. By not giving the user what he or she desires, the vector representation generation that conventional programs provide can thus lead to user frustration with their computing devices and their digital content creation and editing programs.

SUMMARY

To mitigate the drawbacks of conventional digital content creation and editing programs, a geometric construct generation system as implemented by a computing device is described to detect salient geometric constructs from raster representations of sketches. At least one component in a raster representation of a sketch is identified. For each component in the raster representation of the sketch pixels of the component are clustered into multiple proxies, each proxy including multiple pixels. Ones of the multiple proxies are merged based on their similarities and proximities to each other, resulting in multiple merged proxies. For each component in the raster representation of the sketch and responsive to the multiple proxies being merged for the component, pixels within each of the multiple merged proxies as well as merged proxies within the component are sorted into a drawing order, resulting in a set of sorted merged proxies. A set of geometric constructs representing the sketch are generated by fitting one or more geometric constructs onto the sorted merged proxies. Responsive to the set of geometric constructs being generated, the vector representation of the sketch is displayed by displaying the set of geometric constructs.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
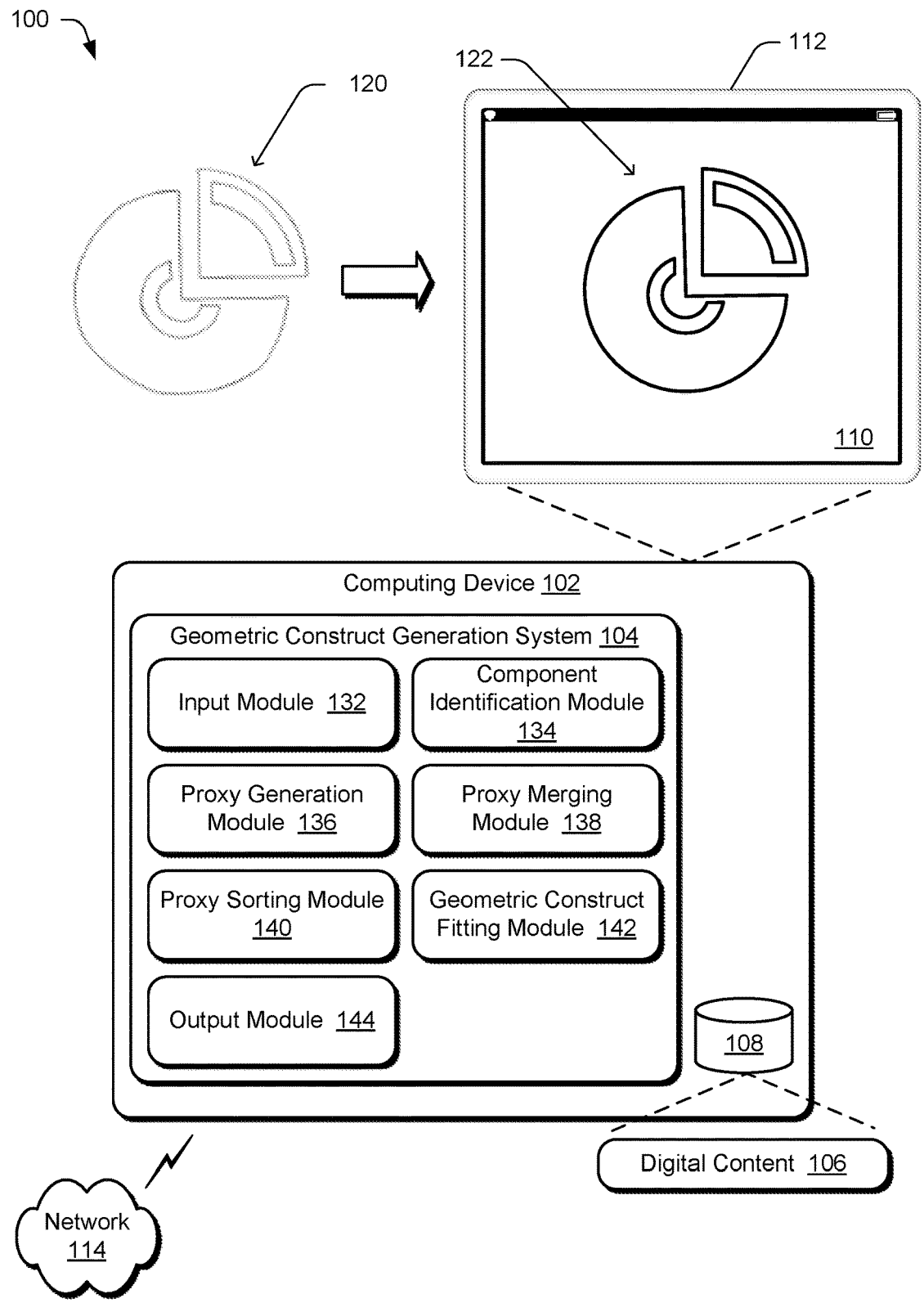
FIG. 1 is an illustration of a digital medium environment in an example implementation that is operable to employ the detecting salient geometric constructs from raster representations of sketches described herein.

Current solutions for generating a vector representation of a sketch from a raster representation of the sketch generate a vector representation that is a faithful representation of the sketch rather than what the user desired the sketch to be. For example, the user may attempt to draw a curve as part of the sketch, however a hand-drawn curve may have some straight parts, may have some arcs with different radii, and so forth. Thus, although the user desires a vector representation of a smooth curve having a particular radius, current solutions generate a vector representation of the sketch that accurately depicts the straight rather than curved parts of the sketch, the different radii of curves in the sketch, and so forth.

To overcome these challenges, a geometric construct generation system generates, from a raster representation of a sketch, a vector representation of the sketch that is an abstraction of the sketch. The raster representation of the sketch refers to identification of multiple pixels that make up a digital version of the sketch. The vector representation of the sketch refers to identification of multiple vectors (e.g., lines, arcs, circles) that make up a digital version of the sketch. The abstraction of the sketch refers to the intent or desire of the user rather than a faithful reconstruction of what the user actually drew. The vector representation discussed herein captures the intent or desire of the user by detecting salient geometric constructs (e.g., circles, arcs, straight lines) of a raster representation of the sketch, and using those detected geometric constructs as the vector representation of the sketch.

Generally, a sketch includes one or more components. Each component is a set of points (pixels) each of which is within a threshold radius of at least one other point in the set. The geometric construct generation system identifies the components in the sketch, and for each component clusters the pixels of the component into multiple proxies. The multiple proxies are merged together based on their similarities and proximity to each other, resulting in a set of merged proxies. For each component, pixels within each of the merged proxies as well as merged proxies within the component are sorted into a natural drawing order. A set of geometric constructs representing the sketch are then generated by fitting one or more geometric constructs (e.g., circular arcs and line segments) onto the merged proxies.

More specifically, a raster representation of a sketch is obtained. The raster representation of the sketch can be obtained from another device or system, or can be generated from a captured image of the sketch. This raster representation of the sketch is, for example, a version of the sketch that has shadows and extraneous marks removed.

A set of one or more components in the raster representation of the sketch is identified. A component of the raster representation refers to a collection of active pixels in the raster representation that are connected (e.g., each pixel in the collection is within a threshold radius (e.g., 3 pixel radius) of at least one other pixel in the collection). Active pixels refer to pixels that have at least a threshold darkness value (e.g., in situations in which color values range from 0 to 255, active pixels are pixels are those with color values less than 160). A neighborhood graph of the active pixels is created and used to identify the connected components (also referred to as simply components).

An estimate of the local normal of each active pixel in each component is also determined. The local normals of the active pixels in a component are used to cluster the active pixels into proxies. A proxy refers to a collection or group of pixels in a component. In one or more implementations, pixels in a proxy have approximately the same normal and each pixel is close to another pixel of the proxy (e.g., within a threshold distance of another pixel of the component (such as 3 pixels) or closer to a pixel in that proxy than to pixels in other proxies). The goal of clustering the active pixels into the set of proxies is that each proxy is to include active pixels having approximately the same normal, each proxy is to be continuous (e.g., no gaps between pixels, although exceptions can be made), and the proxies are to have discontinuities at the natural discontinuities of the raster representation of the sketch.

To generate the proxies, multiple iterations of assigning seed locations for proxies and growing the proxies from the seed locations are performed. Each seed location is an active pixel of the component, and each proxy includes one or more active pixels. In an initial iteration one seed location is assigned randomly and the remaining seed locations are assigned to maintain distance between the different seed locations. In subsequent iterations the seed locations are assigned as the centroids of the proxies identified in the previous iteration.

Proxies are grown by determining a cost of assigning an active pixel to a given proxy. Active pixels are placed in a priority queue, and for each active pixel in the priority queue the proxy generation module uses the cost function to determine the cost of assigning the active pixel to a neighboring proxy. In one or more implementations, a neighboring proxy refers to a proxy that is within a threshold distance (e.g., 3 pixels) of the active pixel. Additionally or alternatively, the neighboring proxy can refer to other proxies, such as a proxy including the closest pixel to the active pixel (regardless of the distance). The active pixel having the lowest cost of being assigned to a neighboring proxy is assigned to the neighboring proxy, removed from the priority queue, and then the process of determining costs and assigning the pixel having the lowest cost of being assigned to a neighboring proxy is repeated.

Given the proxies for all of the components in the raster representation of the sketch, neighboring proxies are merged together when particular criteria are met, thereby reducing the number of proxies for a component. In one or more implementations, whether to merge two neighboring proxies is determined based on whether the normals of the proxies are within a threshold amount of one another, and whether the average errors between the proxy normal and local normals are within a threshold amount of one another. If both the normals of two proxies are within a threshold amount of one another (e.g., 2 degrees), and the average errors between the proxy normal and local normals are within a threshold amount (e.g., 3%) of one another, then the two proxies are merged into a single proxy. Otherwise, the two proxies are not merged together.

Furthermore, whether to merge two neighboring proxies can be determined based on the number of pixels included in the proxies. If one of the two neighboring proxies includes less than a threshold number of pixels (e.g., 8 pixels), and the other of the two neighboring proxies includes at least the threshold number of pixels, then the two proxies are merged into a single proxy.

The pixels within each merged proxy are sorted into a drawing order (also referred to as a natural drawing order) of the merged proxy. The drawing order of the merged proxy refers to an order in which a user would typically sketch or draw the pixels in the merged proxy (e.g., from one end of the merged proxy to the other). The pixels within each merged proxy are sorted by selecting an initial pixel in the merged proxy (e.g., a pixel that has a highest number of adjacent pixels that are included in other merged proxies). This initial pixel is added to a set of sorted pixels and the remaining pixels in the merged proxy are placed in a set of unsorted pixels. A pixel from the set of unsorted pixels having a lowest cost of being added to the set of sorted pixels is selected and added to the set of sorted pixels (and that selected pixel from the set of unsorted pixels). The cost of adding a pixel to the set of sorted pixels is based on the distance (e.g., Euclidean distance) between the pixel in the set of unsorted pixels and the pixels in the set of sorted pixels. This process continues until all pixels in the proxy have been added to the set of sorted pixels (and removed from the set of unsorted pixels). A record of the order in which pixels are added to the set of sorted pixels is maintained as the drawing order of pixels in the merged proxy.

The merged proxies within each component are also sorted into a drawing order (also referred to as a natural drawing order) for each component. The drawing order of the component refers to an order in which a user would typically sketch or draw the component (e.g., beginning at a corner rather than in the middle of an arc). This sorting uses the sorted merged proxies, and can include reversing the order of a sorted merged proxy.

The merged proxies within a component are sorted by selecting, as an initial current proxy, a merged proxy for the component that has a largest variation in normal from a neighboring merged proxy. The current proxy is added to a set of sorted merged proxies and the remaining merged proxies are put into a set of unsorted merged proxies. A determination of the distance (e.g., Euclidean distance) between the end point of the current proxy and both the start points and end points of each merged proxy in the unsorted merged proxies that is neighboring the current proxy is made.

If a start point of a neighboring merged proxy has a smallest distance to the end point of the current proxy, then that neighboring merged proxy is added to the set of sorted merged proxies (and is removed from the set of unsorted merged proxies). That neighboring merged proxy becomes the new current proxy. However, if an end point of a neighboring merged proxy has a smallest distance to the end point of the current proxy, then the order of pixels for that neighboring merged proxy is reversed, that neighboring merged proxy is also added to the set of sorted merged proxies (and is removed from the set of unsorted merged proxies), and becomes the new current proxy.

A record of the order in which merged proxies are added to the set of merged proxies is maintained, and this order is the natural drawing order of merged proxies in the component after all merged proxies have been added to the set of sorted merged proxies.

A set of geometric constructs representing the sketch are generated by fitting one or more geometric constructs (e.g., circular arcs and straight line segments) onto the merged proxies. These geometric constructs are also referred to as salient geometric constructs because they capture the most noticeable or prominent geometric constructs indicated by the sketch. These geometric constructs are the vector representation of the sketch. In one or more implementations, the geometric constructs are generated by generating a length-angle plot of sorted merged proxies in tangent space. Each horizontal portion of the length-angle plot represents a length of a merged proxy, and each vertical portion of the length-angle plot represents an angle between two merged proxies. Portions of the length-angle plot where the horizontal lengths are approximately the same as the vertical lengths (e.g., within a threshold amount of one another, such as 5%) correspond to curves in the sketch. Portions of the length-angle plot where the horizontal lengths are not approximately the same as the vertical lengths (e.g., are not within a threshold amount of one another, such as 5%) correspond to straight lines in the sketch.

Arcs are generated based on a determination that the midpoints of the horizontal lines in the length-angle plot are collinear for sorted merged proxies that are part of the same arc (e.g., have the same radius and center). The beginning and ending points of the arc are determined based on the start points and end points of the proxies corresponding to the arc. The radius of each arc is determined by finding a circle that is a best fit through the midpoints of the proxies corresponding to the arc. These arcs are included as part of the geometric constructs for the sketch. The straight line geometric constructs are straight lines ranging from the start point to the end point of the proxies corresponding to horizontal lines of the length-angle plot that are not part of an arc. In one or more implementations, the geometric constructs are a vector representation of the straight lines and arcs that make up the components of the sketch.

The vector representation of the sketch is an abstracted version of the sketch. The vector representation of the sketch can be output in a variety of different manners, such as displaying the vector representation, storing the vector representation in a local or remote storage device, transmitting the vector representation to another device or system, making the vector representation available to a digital content editing system, and so forth.

The techniques discussed herein generate a compact vector representation of a raster representation of a sketch that closely reflects the user's intent in making the sketch. By reflecting the user's intent in making the sketch, these techniques accelerate transition from a hand-drawn (e.g., on paper) sketch to a vector representation of the sketch, thereby increasing the speed with which digital content can be created, such as for logo and icon creation workflows. This increased speed with which digital content can be created reduces resource usage (e.g., processing capacity, power) due to the user not needing to spend as much time generating the vector representation of the digital content.

Furthermore, the techniques discussed herein allow a user to quickly and easily generate a vector representation from a raster representation of a sketch, the vector representation including regular geometric shapes (e.g., circles, arcs, and straight lines) that can be used to further simply digital content editing workflows. The vector representation allows additional digital content editing functionality to be used with the vector representation, such as flood fill techniques (e.g., which typically rely on an enclosed shape). Furthermore, the vector representation allows for reduced resource usage (e.g., processing capacity, power) because the user need not expend time fixing or correcting the vector representation so that it works as intended with other functionality.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the detecting salient geometric constructs from raster representations of sketches described herein. The illustrated environment 100 includes a computing device 102, which may be configured in a variety of ways. The computing device 102, for instance, may be configured as a desktop computer, a server computer, a laptop computer, a mobile device (e.g., assuming a handheld configuration such as a tablet or mobile phone), a wearable device (e.g., augmented reality or virtual reality headsets), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 11.

The computing device 102 is illustrated as including a geometric construct generation system 104. The geometric construct generation system 104 is illustrated as being implemented as a standalone system. Additionally or alternatively, the geometric construct generation system 104 can be implemented as part of another system or program, such as a digital content editing program, a digital content capture program, and so forth.

The geometric construct generation system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. The digital content 106 refers to digital images, such as digital still images (e.g., digital pictures) or digital video. The storage 108 can be any of a variety of different types of storage, such as random access memory (RAM), Flash memory, solid state drive, magnetic disk drive, and so forth. Although illustrated as implemented locally at the computing device 102, functionality of the geometric construct generation system 104 may also be implemented in whole or part via functionality available via the network 114, such as part of a web service or "in the cloud."

The geometric construct generation system 104 generates a vector representation from a raster representation of a sketch (e.g., the vector representation being the digital content 106). For example, the geometric construct generation system 104 receives as an input a raster representation 120 of a sketch, and generates digital content including a vector representation 122 of the sketch. An example of functionality incorporated by the geometric construct generation system 104 to process the digital content 106 is illustrated as an input module 132, a component identification module 134, a proxy generation module 136, a proxy merging module 138, a proxy sorting module 140, a geometric construct fitting module 142, and an output module 144.

The input module 132 implements functionality to capture or otherwise obtain a raster representation of a sketch. The component identification module 134 implements functionality to identify one or more components in the raster representation of the sketch. The proxy generation module 136 implements functionality to cluster the pixels of the components into groups of pixels referred to as proxies.

The proxy merging module 138 implements functionality to merge the proxies of each component together based on their similarities and proximity to each other, resulting in a set of merged proxies. The proxy sorting module 140 implements functionality to sort the pixels within each of the merged proxies as well as sorts the merged proxies within each component into a natural drawing order. The geometric construct fitting module 142 implements functionality to generate a set of salient geometric constructs representing the sketch by fitting one or more geometric constructs (e.g., circular arcs and line segments) onto the merged proxies. These geometric constructs are the vector representation of the sketch. The output module 144 implements functionality to output the vector representation of the sketch, such as by displaying the sketch, storing the sketch, and so forth.

Figure 2:
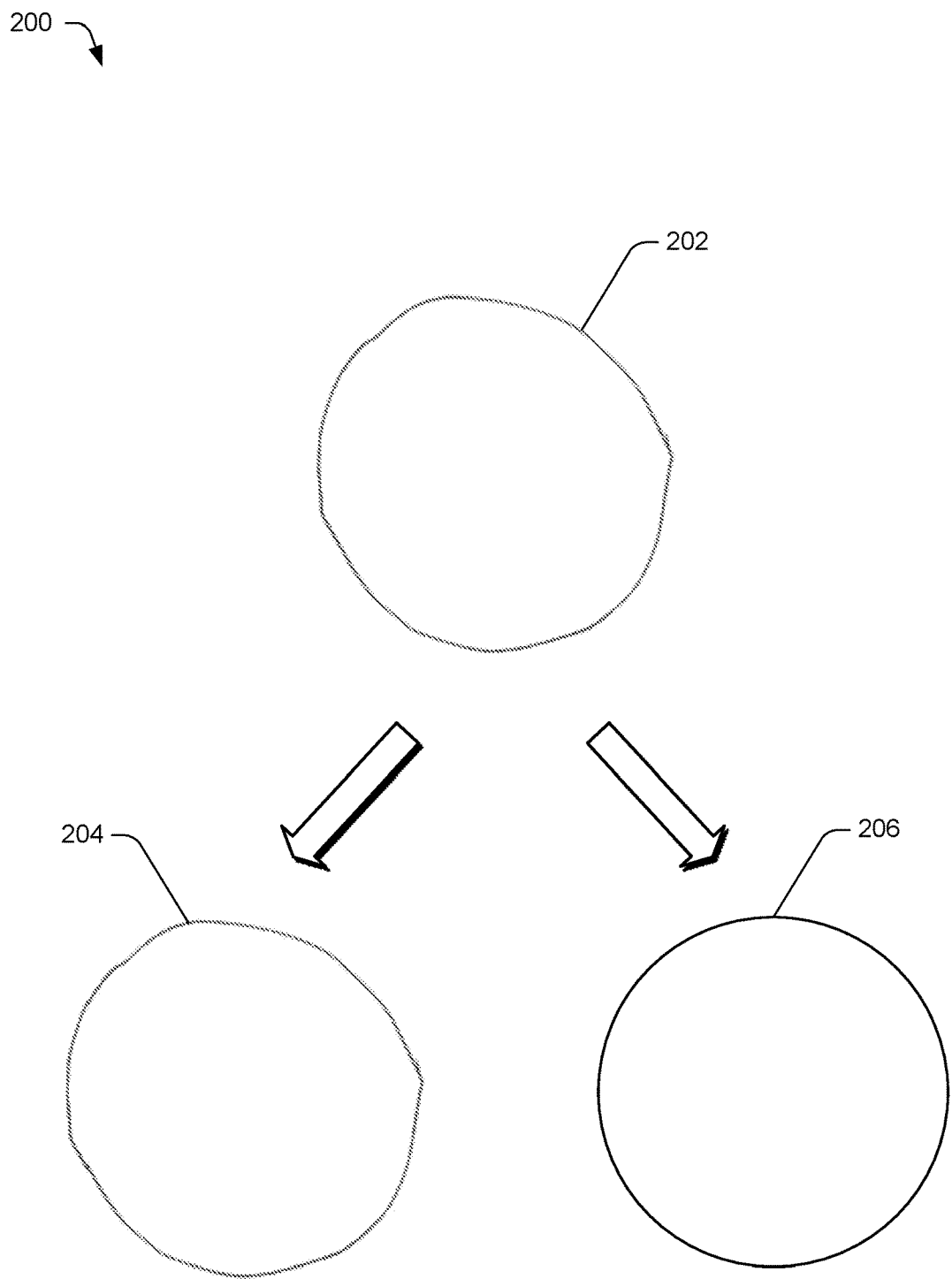
FIG. 2 illustrates an example of the difference between the abstraction of a sketch and a faithful representation of the sketch.

The geometric construct generation system 104 generates a vector representation that is an abstraction of a sketch rather than a vector representation that is a faithful representation of the sketch. FIG. 2 illustrates an example 200 of the difference between the abstraction of a sketch and a faithful representation of the sketch. The example 200 includes a raster representation 202 of a sketch. As illustrated, the sketch is approximately a circle.

The example 200 also includes a vector representation 204 that is a faithful representation of the sketch. As illustrated, some straight portions, vertices, overlapping lines, and so forth that are present in the raster representation 202 are also present in the vector representation 204.

The example 200 also includes a vector representation 206 that is an abstraction of the sketch. The geometric construct generation system 104 captures the intent or desire of the user to generate a circle, and generates the vector representation 206 that is a circle. In contrast to the vector representation 204, the straight portions, vertices, overlapping lines, and so forth that are present in the raster representation 202 of the sketch are not present in the vector representation 206 of the sketch.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Geometric Construct Generation System Architecture

Figure 3:
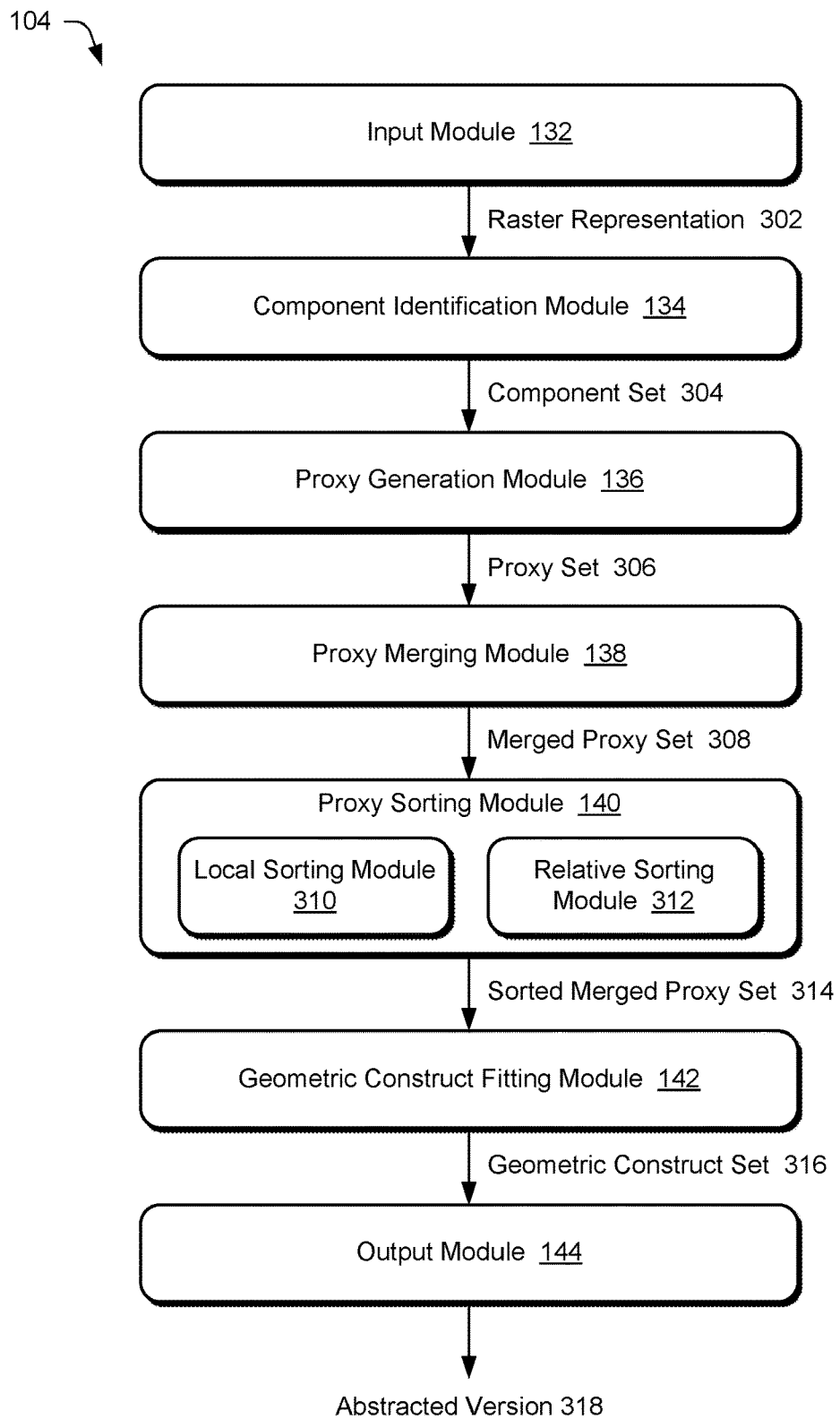
FIG. 3 is an illustration of an example architecture of a geometric construct generation system.

FIG. 3 is an illustration of an example architecture of a geometric construct generation system 104. The geometric construct generation system 104 includes the input module 132, the component identification module 134, the proxy generation module 136, the proxy merging module 138, the proxy sorting module 140, the geometric construct fitting module 142, and the output module 144.

The input module 132 implements functionality to capture or otherwise obtain a raster representation of a sketch, and provides the raster representation 302 of the sketch to the component identification module 134. In one or more implementations, the input module 132 receives a raster representation of the sketch from another system or module. Additionally or alternatively, the input module 132 captures an image of the sketch (e.g., using a camera of the device implementing the geometric construct generation system 104) and translates the captured image to a raster representation of the sketch. This raster representation of the sketch is a version of the sketch that has shadows and extraneous marks removed. The input module 132 can generate the raster representation of the sketch in various manners, such as by using one or more machine learning systems trained to generate the raster representation of the sketch from the captured image of the sketch. Any of a variety of machine learning systems can be used to generate the raster representation of the sketch, such as generative adversarial networks.

The component identification module 134 implements functionality to identify a component set, which is a set of one or more components in the raster representation 302 of the sketch. A component of raster representation 302 refers to a collection of active pixels in the raster representation 302 that are connected (e.g., each pixel in the collection is within a threshold radius (e.g., 3 pixel radius) of at least one other pixel in the collection). Active pixels refer to pixels that have at least a threshold darkness value (e.g., in situations in which color values range from 0 to 255, active pixels are pixels are those with color values less than 160). In one or more implementations, the threshold darkness value is changed if not enough pixels (e.g., less than a threshold number of pixels) are identified as active pixels. For example, the component identification module 134 can increment the threshold darkness value (e.g., by some amount, such as 2 or 3) until there are a threshold number of pixels identified as active pixels.

The component identification module 134 creates a neighborhood graph of the active pixels and identifies the connected components (also referred to as simply components) based on the neighborhood graph. Any of a variety of public or proprietary techniques can be used to find connected components given the neighborhood graph, such as a depth-first search. In one or more implementations, the component identification module 134 imposes a size threshold on the components. If a component includes less than a threshold number of pixels (e.g., less than 40 pixels), then the component is excluded from the component set. The component set identifies, for each component in the raster representation 302, the pixels that make up that component.

Figure 4:
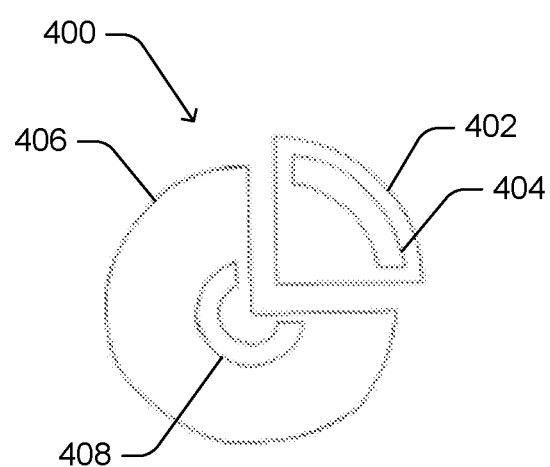
FIG. 4 illustrates an example raster representation of a sketch.

FIG. 4 illustrates an example raster representation 400 of a sketch. As illustrated, the raster representation 400 includes four components 402, 404, 406, and 408.

The component identification module 134 provides the component set, illustrated as component set 304 of FIG. 3, to the proxy generation module 136. The proxy generation module 136 implements functionality to cluster the pixels of the components in the component set 304 into groups of pixels referred to as proxies. The use of proxies allows the geometric construct generation system 104 to cluster the pixels of the components in the component set 304 into elements that are easier to group and manipulate in subsequent operations than individual pixels are.

The proxy generation module 136 also determines an estimate of the local normal of each pixel in each component. The proxy generation module 136 determines the estimate of the local normal of a given pixel by using the eigenvectors of the covariance matrix for principal component analysis on the set of pixels within a particular radius of the given pixel (e.g., all pixels within 4 pixels of the given pixel).

For each component in the component set 304, the proxy generation module 136 uses the local normals of the pixels in that component to cluster the pixels into proxies. The goal of the proxy generation module 136 in clustering the pixels into the set of proxies is that each proxy is to include pixels having approximately the same normal, each proxy is to be continuous (e.g., no gaps between pixels, although exceptions can be made), and the proxies are to have discontinuities at the natural discontinuities of the raster representation 302 of the sketch.

Figure 5:
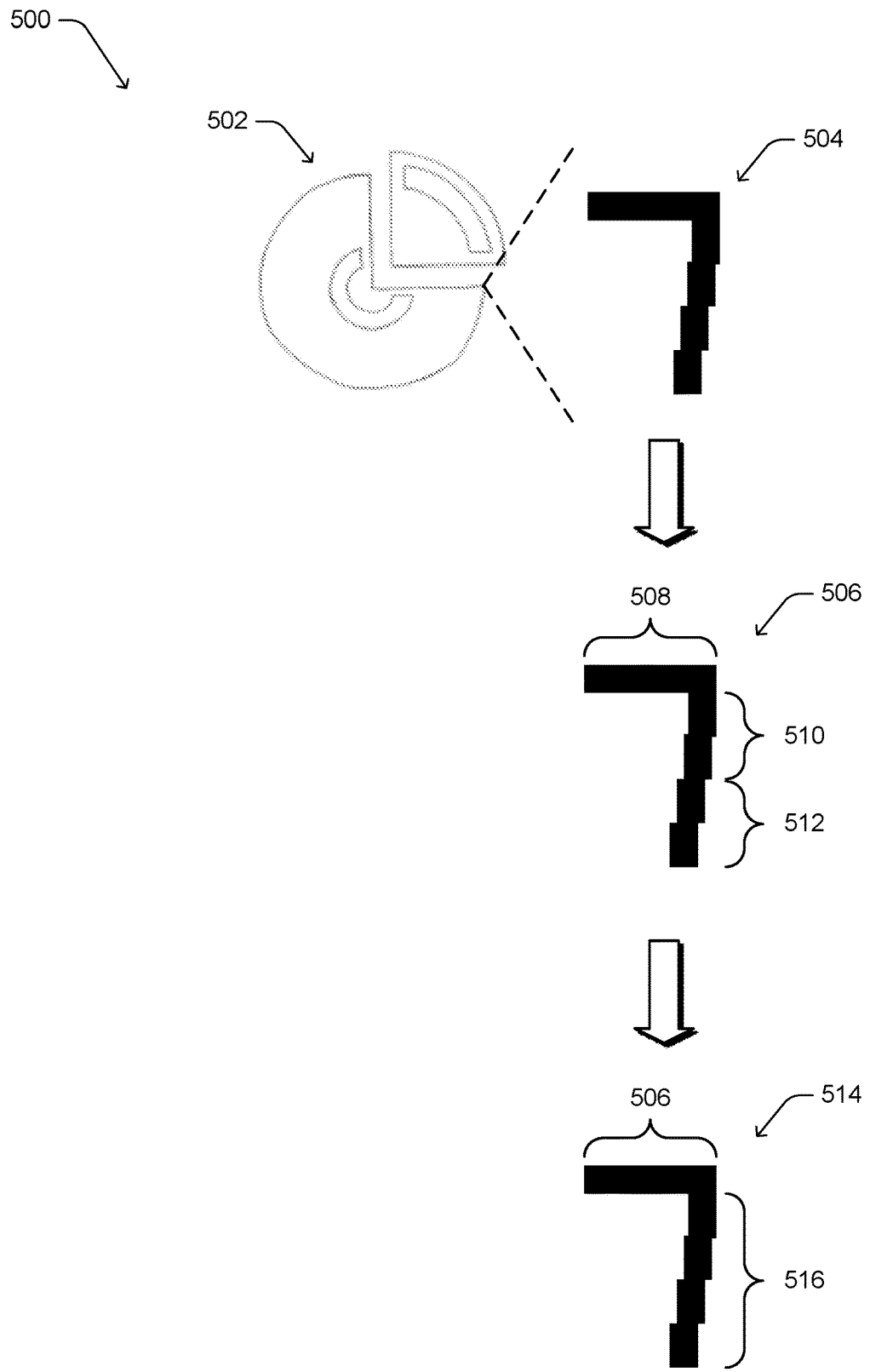
FIG. 5 illustrates an example of proxies.

FIG. 5 illustrates an example 500 of proxies. A raster representation 502 of a sketch is illustrated and a magnified portion 504 of the raster representation 502 is illustrated. The magnified portion 504 illustrates a horizontal portion made up of multiple pixels, and four vertical portions that are each made up of multiple pixels. The four vertical portions represent part of a curve in the raster representation 502, but appear to be vertical due to the portion 504 being magnified and the 2-dimensional grid nature of pixel displays. At 506, three proxies 508, 510, and 512 are illustrated, each being a group of multiple pixels.

Returning to FIG. 3, the proxy generation module 136 determines an estimated number of proxies for the component. In one or more implementations, this estimated numbers of proxies is equal to the number of pixels in the component divided by a constant (e.g., 20). The component identification module 134 performs multiple iterations of assigning seed locations for proxies and growing the proxies. Each seed location is a pixel of the component, and each proxy includes one or more pixels.

In the initial iteration, an initial proxy is assigned a seed location randomly (or pseudorandomly). Each additional proxy is then assigned a seed location that is furthest from all seed locations previously assigned in this iteration. This assigning of seed locations furthest from other seed locations helps ensure that the seed locations are distributed about the component, and that two seed locations are not adjacent one another. The determination of a seed location that is furthest from other seed locations can be made based on various different distance measures, such as Euclidean distance. After all proxies are assigned a seed location, the proxies are grown from their respective seed locations.

The proxy generation module 136 maintains a priority queue made up of pixels that have not yet been assigned to a proxy. The pixels in the priority queue are thus a proper subset of the pixels of the component. Each time a pixel is assigned to a proxy, the neighboring pixels of the assigned pixel that have themselves not yet been assigned to a proxy are added to the priority queue. The neighboring pixels refer to pixels that are within a threshold distance of the assigned pixel. In one or more implementations, the neighboring pixels refer to pixels that are adjacent to the assigned pixel (e.g., a threshold distance of 1 pixel). Additionally or alternatively, other threshold distances can be used, such as 2 or 3 pixels.

The proxy generation module 136 greedily adds pixels to the proxies. The proxy generation module 136 uses a cost function that determines a cost of assigning a pixel in the priority queue to a given proxy. For each pixel in the priority queue, the proxy generation module 136 uses the cost function to determine the cost of assigning the pixel to a neighboring proxy. In one or more implementations, a neighboring proxy refers to a proxy that is within a threshold distance (e.g., 3 pixels) of the pixel. Additionally or alternatively, the neighboring proxy can refer to other proxies, such as a proxy including the closest pixel to the pixel (regardless of the distance).

The pixel having the lowest cost of being assigned to a neighboring proxy is assigned to the neighboring proxy and is removed from the priority queue. Additionally, as discussed above the neighboring pixels of the assigned pixel that have themselves not yet been assigned to a proxy are added to the priority queue. This process of assigning a pixel to a proxy, removing the pixel from the priority queue, and adding neighboring pixels to the priority queue is continued until all pixels in the component have been assigned to a proxy.

The cost function is based on the normal of the pixel for which the cost is being determined and the normal of the neighboring proxy (which in the initial iteration is the normal of the pixel at the seed location). In implementing the cost function, the proxy generation module 136 takes into account various factors, including: 1) if the cost of adding the pixel to the neighboring proxy is zero, then the pixel is added to the neighboring proxy (the cost is zero if the normal of the neighboring proxy and the normal of the pixel are the same); 2) if there is a proxy with a discontinuity (e.g., a couple pixels missing due to gaps in the component), the cost function favors adding adjacent pixels before bridging this discontinuity; and 3) the cost function allows pixels that are not adjacent to the proxy to be added to the proxy, but favors not doing so.

In one or more implementations, the cost function identifying the cost $C_p$ of assigning an as-yet-unassigned pixel (p) to a given proxy (pr) is:

$$C_p = \alpha \times \text{dist}(p_c, p) + \sphericalangle(\perp_p, \perp_{pr})$$

where $\perp_p$ refers to the normal of the pixel p, $\perp_{pr}$ refers to the normal of the proxy pr, $p_c$ refers to the closest pixel in the proxy pr to the pixel p, and $\text{dist}(p_c, p)$ refers to the distance between $p_c$ and p. The value $\alpha$ is a constant that is selected to be sufficiently large so that the distance between the pixel p and the closest pixel $p_c$ of the proxy pr will dominate, and the angle between $\perp_p$ and $\perp_{pr}$ is used for tiebreakers, which causes the proxies to grow as connected (adjacent) set of pixels, favoring adding adjacent pixels before bridging discontinuities. Values for a can range, for example, from 10 to 200.

It should be noted that with this cost function allows proxies to be generated that include discontinuities (e.g., a couple pixels missing due to gaps in the component). Although the cost function favors distance so closer pixels (e.g., adjacent pixels) are added to the proxy before bridging a discontinuity, bridging the discontinuity can occur.

In one or more implementations, references herein to the normal of a point or the normal of a proxy refer to the line that includes the normal of the point or the line that includes the normal of the proxy. The line that includes the normal is used because the orientation of the normal may not, and need not, be known.

It should be noted that although proxy generation module 136 is discussed as adding to the priority queue the neighboring pixels of an assigned pixel that have themselves not yet been assigned to a proxy, additionally or alternatively the proxy generation module 136 could add pixels to the priority queue at different times. For example, the proxy generation module 136 could initially add all pixels that are not a seed location to the priority queue. However, by adding only neighboring pixels of an assigned pixel each time a pixel is assigned to a proxy, the proxy generation module 136 is more efficient because the cost of assigning a pixel to a given proxy is determined only for pixels close to proxies rather than all pixels that have not yet been assigned to proxies.

After all pixels in all of the components have been assigned to a proxy, the iteration is completed. The proxy generation module 136 begins a new iteration of assigning seed locations for proxies and growing the proxies.

In iterations other than the initial iteration, seed locations are assigned based on the proxies generated in the previous iteration. In one or more implementations, the seed location of each proxy is assigned to be a pixel closest to the centroid of the proxy. For example, the seed location assigned to a proxy in the initial iteration may end up, after growing the proxy, to be the leftmost pixel of a horizontal line in a proxy of 50 pixels. In the next iteration, the seed location assigned to the proxy would be the pixel closest to the centroid of the 50-pixel proxy.

The normal of each proxy is also generated. In iterations other than the initial iteration, the normal of the proxy is determined based on all of the pixels in the proxy rather than just the pixel at the seed location. In one or more implementations, the normal of the proxy is determined by using any of a variety of public or proprietary techniques to find a line of best fit through all of the pixels in the proxy. The normal of that best fit line is the normal of the proxy.

In one or more implementations, during each iteration (e.g., at the end of the iteration, or at the beginning of a subsequent iteration), the proxy generation module 136 discards proxies that include less than a threshold number of pixels (e.g., less than 6 pixels). Once a proxy is discarded, this results in a decreased number of proxies for each subsequent iteration.

The proxy generation module 136 performs multiple iterations of assigning seed locations for proxies and growing the proxies as discussed above. In one or more implementations, the proxy generation module 136 performs a fixed number of iterations, such as 10. Additionally or alternatively, the proxy generation module 136 performs iterations until the proxies between consecutive iterations change less than a threshold amount. For example, the proxy generation module 136 performs iterations until the assignments of pixels to proxies between consecutive iterations differ by less than a threshold amount (e.g., 3% of the number of pixels in each component).

The performance of multiple iterations of assigning seed locations for proxies and growing the proxies allows the proxy generation module 136 to gravitate towards aligning the proxies for a component with the dominant features (e.g., portions of straight lines and arcs) of the component.

In the discussion herein, each iteration is discussed as assigning seed locations for proxies and growing the proxies for each component in the raster representation 302 of the sketch. Additionally or alternatively, the components in the raster representation 302 of the sketch may be treated individually. In such situations, seed locations are assigned for proxies and proxies are grown for a single component (or a subset of components) in a series of iterations. Once the iterations for a single component (or a subset of components) is completed, seed locations are assigned for proxies and proxies are grown for one or more other components in a subsequent series of iterations.

The proxy generation module 136 provides a proxy set 306 to the proxy merging module 138. The proxy set 306 is an indication, for each component in the raster representation 302 of the sketch, of the proxies identified by the proxy generation module 136 and the pixels included in those proxies. The proxies in the proxy set 306 are the proxies grown from the last iteration of assigning seed locations for proxies and growing the proxies for each component in the raster representation 302 of the sketch.

The proxy merging module 138 implements functionality to merge (combine) the proxies in the proxy set 306 together based on their similarities and proximity to each other, resulting in a merged proxy set 308. Generally, the proxy merging module 138 detects when proxies for a component have approximately the same normal, and merges together two proxies having approximately the same normal into a single proxy. This reduction of proxies via merging facilitates detection of geometric primitives discussed in more detail below.

The example 500 of FIG. 5 also includes an example of merging proxies. At 514 the proxies 510 and 512 are illustrated as having been merged into a merged proxy 516.

Returning to FIG. 3, in one or more implementations, the proxy merging module 138 uses thresholding to determine which proxies of a component to merge with one or more other proxies. The proxy merging module 138 analyzes, for each component in the raster representation 302 of the sketch, the proxies in the proxy set 306. This analysis includes computing the length of the proxy, a normal of the proxy, and an average error between the proxy normal and local normals.

The length of the proxy refers to the number of pixels in the proxy. The normal of the proxy is generated as an average of local normals (the normals of each pixel in the proxy, which can be generated as discussed above). The average error between the proxy normal and the local normals is calculated by determining, for each local normal, the difference between the proxy normal and the local normal, and then generating an average of those differences. A higher magnitude of this average error between the proxy normal and the local normals is indicative of non-zero curvature of a proxy, whereas straight lines have a near-zero error.

The proxy merging module 138 determines whether to merge two neighboring proxies. Two proxies are neighboring proxies if each proxy has one or more pixels within a threshold distance (e.g., 3 pixels) of the other proxy. In one or more implementations, the proxy merging module 138 makes the determination to merge two neighboring proxies based on whether the normals of the proxies are within a threshold amount of one another, and whether the average errors between the proxy normal and local normals are within a threshold amount of one another. If both the normals of two proxies are within a threshold amount of one another (e.g., 2 degrees), and the average errors between the proxy normal and local normals are within a threshold amount (e.g., 3%) of one another, then the two proxies are merged into a single proxy. However, if one or both of the normals of two proxies are not within a threshold amount of one another (e.g., 2 degrees), and the average errors between the proxy normal and local normals are not within a threshold amount (e.g., 3%) of one another, then the two proxies are not merged into a single proxy. Effectively, the proxy merging module 138 merges together two neighboring linearly aligned proxies, as well as two neighboring proxies of approximately the same normal and curvature (as indicated by the average errors between the proxy normal and local normals).

Additionally, in some situations the proxy set 306 includes one or more very small proxies, which refer to proxies including less than a threshold number (e.g., 8) pixels. Very small proxies are typically a result of proxies that do not grow because of an error in the proxy normal. Such errors can arise, for example, when the proxy includes an anomaly (e.g., a random sketch), or includes pixels on either side of a corner. The proxy merging module 138 merges these very small proxies with a neighboring proxy that is larger (e.g., includes greater than the threshold number of pixels).

It should be noted that in some situations the proxy merging module 138 may not merge a proxy in the proxy set 306 with another proxy. In these situations, such a proxy that has not been merged with another proxy is included in the merged proxy set 308 and thus is still referred to as a merged proxy.

The proxy sorting module 140 includes a local sorting module 310 and a relative sorting module 312. The local sorting module 310 implements functionality to sort the pixels within each of the merged proxies in the merged proxy set 308 into a drawing order (e.g., also referred to as a natural drawing order) of the merged proxy. The drawing order of the merged proxy refers to an order in which a user would typically sketch or draw the pixels in the proxy. For example, if one of the merged proxies is in the shape of a "I", a user would typically sketch or draw the "I" shape starting at one of the two ends rather than starting in the middle of the "I" and drawing two lines each extending to a different one of the two ends. This sorting performed by the local sorting module 310 allows identification of the ends (e.g., start point and end point) for each merged proxy, as well as other points (e.g., a midpoint) for each merged proxy.

The relative sorting module 312 implements functionality to sort the merged proxies in the merged proxy set 308 into a drawing order (e.g., also referred to as a natural drawing order) for each component. The drawing order of the component refers to an order in which a user would typically sketch or draw the component. For example, if the component included a line in the shape of a "C", a user would typically sketch or draw the "C" shape starting at one of the two ends rather than starting in the middle of the "C" shape and drawing two lines each extending to a different one of the two ends.

Figure 6:
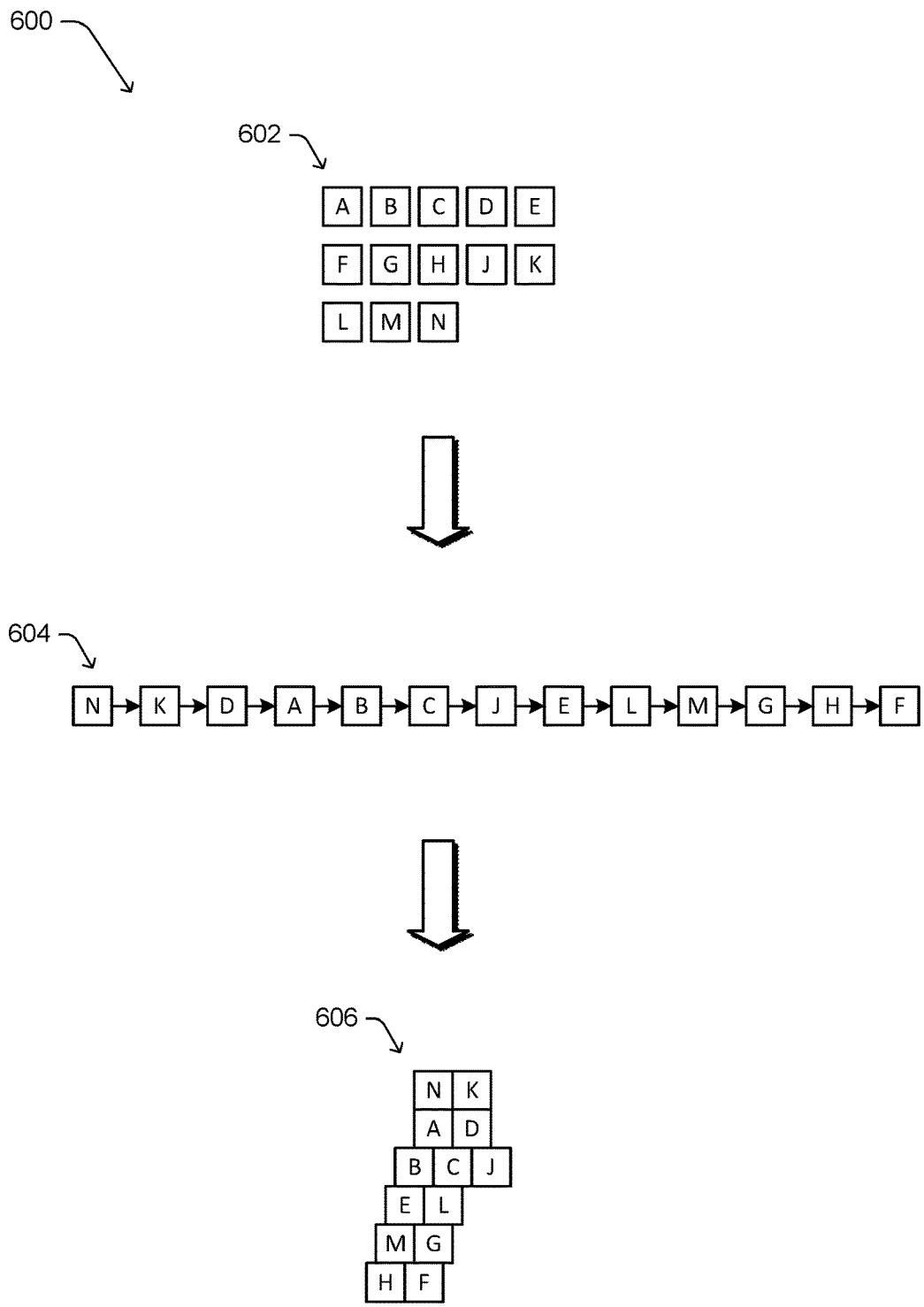
FIG. 6 illustrates an example of sorting the pixels within a merged proxy.

The local sorting module 310 sorts the pixels within each proxy in the merged proxy set 308. FIG. 6 illustrates an example 600 of sorting the pixels within a merged proxy. In the example 600, the merged proxy set 308 includes a proxy 602 that includes pixels A, B, C, D, E, F, G, H, J, K, L, M, and N. The drawing order of these pixels is not yet known. The local sorting module 310 sorts the pixels, resulting in a sorted merged proxy 604. The sorted merged proxy 604 indicates that a start point of the proxy is pixel N, the end point of the proxy is pixel F, and the sorted order of the pixels is N, K, D, A, B, C, J, E, L, M, G, H, F. An example 2-dimensional display of the sorted merged proxy 604 is illustrated at 606, showing a vertical slightly angled line.

Returning to FIG. 3, the local sorting module 310 sorts the pixels within each proxy in the merged proxy set 308 by selecting an initial pixel in the merged proxy that has a highest number of neighboring pixels (e.g., adjacent pixels) that are included in other merged proxies. If multiple pixels in the merged proxy have the same number of neighboring pixels that are included in other merged proxies, then one of those multiple pixels is selected (e.g., randomly or pseudo-randomly) as the initial pixel. The local sorting module 310 adds the initial pixel to a set of sorted pixels and puts the remaining pixels in the merged proxy into a set of unsorted pixels.

The local sorting module 310 proceeds to greedily add pixels to the set of sorted pixels. The local sorting module 310 selects a pixel from the set of unsorted pixels having a lowest cost of being added to the set of sorted pixels, and adds that selected pixel to the set of sorted pixels (also removing that selected pixel from the set of unsorted pixels). The cost of adding a pixel to the set of sorted pixels is based on the distance (e.g., Euclidean distance) between the pixel in the set of unsorted pixels and the pixels in the set of sorted pixels. This process continues until all pixels in the merged proxy have been added to the set of sorted pixels (and removed from the set of unsorted pixels). The local sorting module 310 maintains a record of the order (also referred to as a sorted order) in which pixels are added to the set of sorted pixels, this sorted order becoming the natural drawing order of pixels in the merged proxy after all pixels have been added to the set of sorted pixels. The first pixel added to the set of sorted pixels is the start point of the proxy, and the last pixel added to the set of sorted pixels is the end point of the proxy.

In one or more implementations, the local sorting module 310 uses the following cost function identifying the cost $F_p$ of adding a pixel (p) to the set of sorted pixels (S):

$$F_p = \sum_i^{|S|} W_i \times dist(p_i, p)$$

where $W_i$ refers to a weight assigned to the pixel $p_i$ in the set of sorted pixels (S), $dist(p_i,p)$ refers to the distance between the pixel $p_i$ and p. The weights are assigned so that $W_i > W_{1+1}$ and $W_i = |S| - i$. This weighting weights pixels added to the set of sorted pixels (S) earlier heavier than pixels added to the set of sorted pixels (S) later. This weighting has the effect of allowing multiple pixels in a block that represent the width of a line (since lines in the raster representation 302 of the sketch can be thicker than one pixel) to be ordered close together rather than having an ordering that includes a line 1 pixel wide through the merged proxy, then another line 1 pixel wide through the merged proxy, and so forth.

The relative sorting module 312 sorts all of the pixels in the component from one to the last in an order they would typically be drawn by the user. This sorting uses the sorted merged proxies, and can include reversing the order of a sorted merged proxy as discussed in more detail below.

Figure 7:
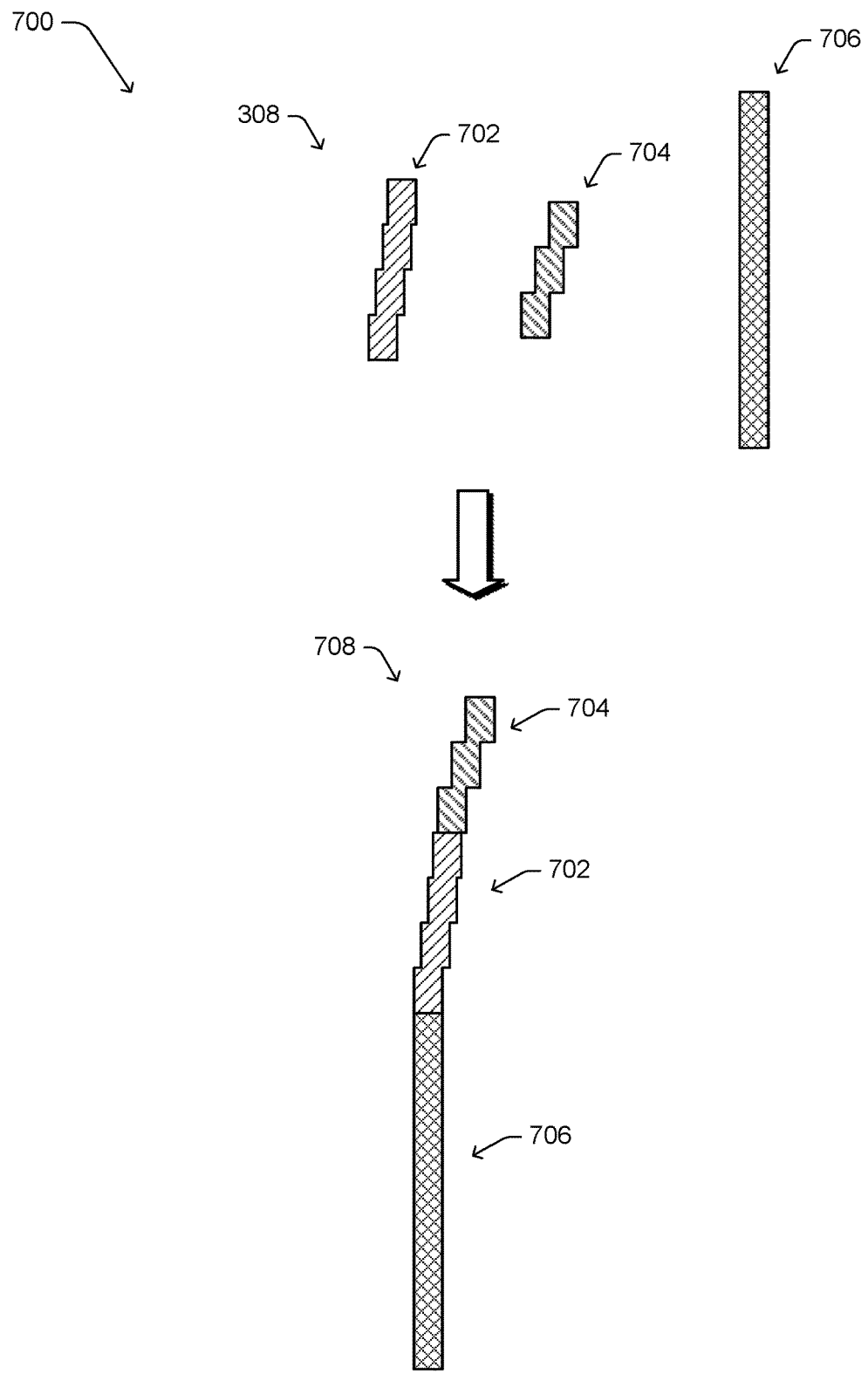
FIG. 7 illustrates an example of sorting the proxies within a component.

FIG. 7 illustrates an example 700 of sorting the proxies within a component. In the example 700, a merged proxy set 308 includes proxies 702, 704, and 706, each of which is shown with different fill to distinguish the proxies from each other in the example 700. The drawing order of these proxies is not yet known. The relative sorting module 312 sorts the proxies, resulting in a sorted merged proxy set 708. The sorted merged proxy set 708 indicates that a start proxy is proxy 704, and the end proxy is proxy 706, and the sorted order of the proxies is 704, 702, 706.

Returning to FIG. 3, in one or more implementations, the relative sorting module 312 sorts the merged proxies within a component (the pixels of which have already been sorted by the local sorting module 310) by selecting, as an initial current proxy, a merged proxy in the merged proxy set 308 for the component that has a largest variation in normal from a neighboring merged proxy. In one or more implementations, the variation in normal from a neighboring merged proxy is determined based on the normals of the proxies (e.g., the difference in angle between the normals of two proxies). Additionally or alternatively, the variation in normal from a neighboring merged proxy can be determined based on the normals of the start points and end points of the proxies (e.g., the difference between the start point of the current proxy and a neighboring proxy having a start point or end point adjacent to the start point of the current proxy, or the difference between the end point of the current proxy and a neighboring proxy having a start point or end point adjacent to the start point of the current proxy).

The relative sorting module 312 adds the current proxy to a set of sorted merged proxies and puts the remaining merged proxies in the merged proxy set 308 into a set of unsorted merged proxies. The relative sorting module 312 then determines the distance (e.g., Euclidean distance) between the end point of the current proxy and both the start points and end points of each merged proxy in the unsorted merged proxies that is neighboring the current proxy. If a start point of a neighboring merged proxy has a smallest distance to the end point of the current proxy, then that neighboring merged proxy is added to the set of sorted merged proxies (and is removed from the set of unsorted merged proxies). That neighboring merged proxy becomes the new current proxy.

However, if an end point of a neighboring merged proxy has a smallest distance to the end point of the current proxy, then the order of pixels for that neighboring merged proxy is reversed and the relative sorting module 312 updates the record of the sorted order of that neighboring merged proxy to reflect the new sorted order of that neighboring merged proxy. That neighboring merged proxy is also added to the set of sorted merged proxies (and is removed from the set of unsorted merged proxies), and becomes the new current proxy.

This process of determining the distance between the end point of the current proxy and both the start points and end points of each merged proxy in the unsorted merged proxies that is neighboring the current proxy and adding the neighboring merged proxy to the set of sorted merged proxies (and removing the neighboring merged proxy from the set of unsorted merged proxies) is repeated until all merged proxies have been removed from the set of unsorted merged proxies.

The local sorting module 310 maintains a record of the order (also referred to as a sorted order) in which merged proxies are added to the set of merged proxies, this sorted order becoming the natural drawing order of merged proxies in the component after all merged proxies have been added to the set of sorted merged proxies. The first proxy added to the set of sorted merged proxies is the start proxy of the component, and the last proxy added to the set of sorted merged proxies is the end proxy of the component.

The proxy sorting module 140 outputs the merged proxies, as sorted by the proxy sorting module 140, as the sorted merged proxy set 314. The geometric construct fitting module 142 receives the sorted merged proxy set 314 and implements functionality to generate a set of geometric constructs representing the sketch by fitting one or more geometric constructs (e.g., circular arcs and straight line segments) onto the merged proxies. These geometric constructs are the vector representation of the sketch.

In one or more implementations, the geometric construct fitting module 142 generates the geometric constructs by transforming the sorted merged proxies in the sorted merged proxy set 314 to tangent space. Generally, the geometric construct fitting module 142 generates a length-angle plot of sorted merged proxies in tangent space. Each horizontal portion of the length-angle plot represents a length of a merged proxy (longer merged proxies result in longer the horizontal portion). Each vertical portion of the length-angle plot represents an angle between two merged proxies (larger angles result in longer vertical portions). The geometric construct fitting module 142 maintains a record of which sorted merged proxies correspond to which horizontal lines of the length-angle plot.

The geometric construct fitting module 142 determines that portions of the length-angle plot where the horizontal lengths are approximately the same as the vertical lengths (e.g., within a threshold amount of one another, such as 5%) correspond to curves in the raster representation 302 of the sketch. Furthermore, the geometric construct fitting module 142 determines that portions of the length-angle plot where the horizontal lengths are not approximately the same as the vertical lengths (e.g., are not within a threshold amount of one another, such as 5%) correspond to straight lines in the raster representation 302 of the sketch. Additional information regarding the generation of the length-angle plot can be found in "Shape similarity measure based on correspondence of visual parts" by Longin Jan Latecki and Rolf Lakämper, IEEE Transactions on Pattern Analysis and Machine Intelligence, 22:1185-1190 (October 2000), which is hereby incorporated by reference herein in its entirety.

Figure 8:
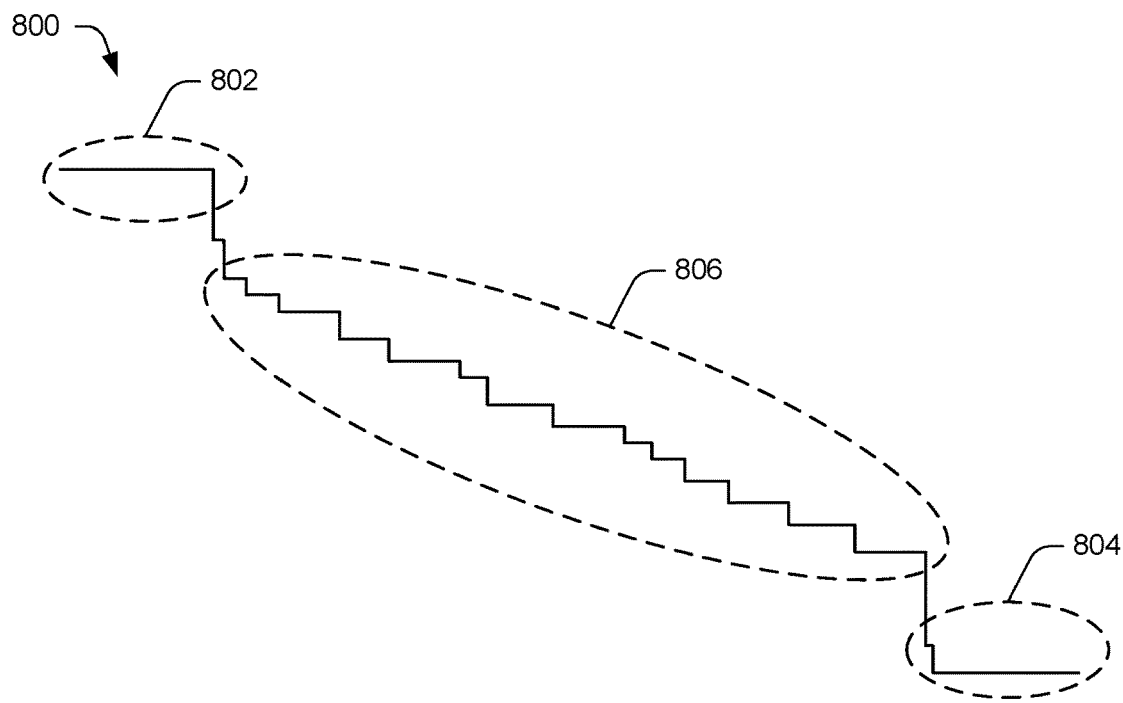
FIG. 8 illustrates an example of a length-angle plot in accordance with one or more implementations.

FIG. 8 illustrates an example of a length-angle plot 800 in accordance with one or more implementations. As illustrated in the length-angle plot 800, portions 802 and 804 each have horizontal lengths that are not approximately the same as the vertical lengths, and thus correspond to straight lines in the raster representation 302 of the sketch. Portion 806, however, has horizontal lengths that are approximately the same as the vertical lengths, and thus correspond to curves in the raster representation 302 of the sketch.

The length-angle plot 800 is, for example, a length-angle plot for a component 406 of the raster representation 400 of FIG. 4. The portions 802 and 804 correspond to the vertical and horizontal lines of the component 406, and the portion 806 corresponds to the circular portion of the component 406.

Returning to FIG. 3, the geometric construct fitting module 142 generates arcs based on a determination that the midpoints of the horizontal lines in the length-angle plot are collinear for sorted merged proxies that are part of the same arc (e.g., have the same radius and center). Two groups of horizontal lines in the length-angle plot having midpoints that are not collinear, or that are separated by a large angle (e.g., greater than a threshold angle and thus the horizontal lengths are not approximately the same as the vertical lengths) correspond to sorted merged proxies that are part of two different arcs. The geometric construct fitting module 142 determines that remaining portions of the length-angle plot that correspond to sorted merged proxies that are not part of an arc are part of straight lines.

Figure 9:
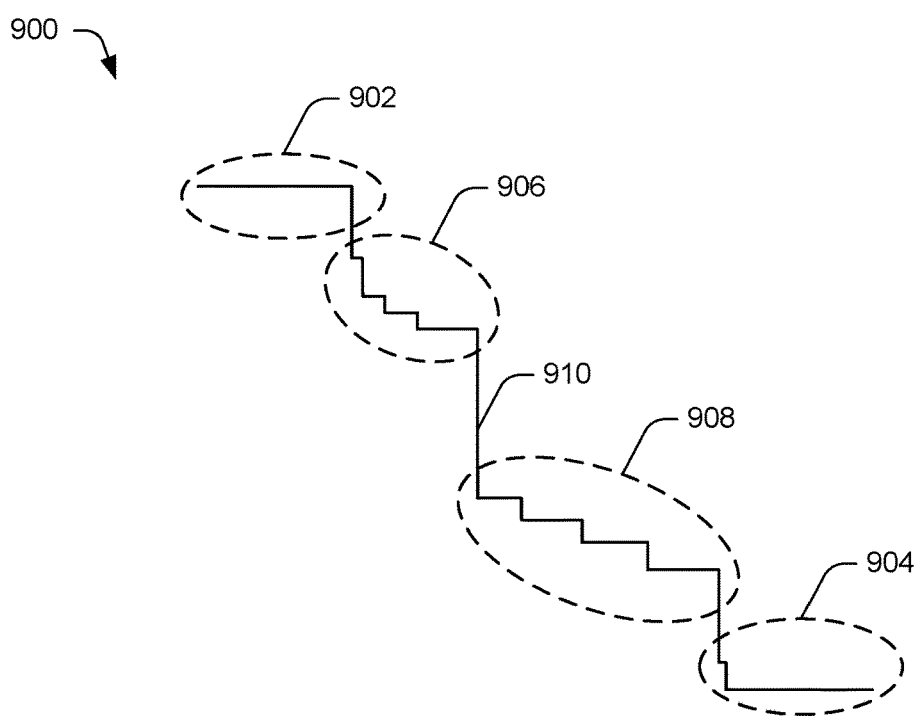
FIG. 9 illustrates another example of a length-angle plot in accordance with one or more implementations.

FIG. 9 illustrates another example of a length-angle plot 900 in accordance with one or more implementations. As illustrated in the length-angle plot 900, portions 902 and 904 each have horizontal lengths that are not approximately the same as the vertical lengths, and thus correspond to straight lines in the raster representation 302 of the sketch. Portion 906 has horizontal lengths that are approximately the same as the vertical lengths, and thus correspond to curves in the raster representation 302 of the sketch. Similarly portion 908 has horizontal lengths that are approximately the same as the vertical lengths, and thus correspond to curves in the raster representation 302 of the sketch. However, the portions 906 and 908 separated by a large angle (e.g., indicated by vertical line 910), and thus each of portions 906 and 908 corresponds to a different arc in the raster representation 302 of the sketch.

Returning to FIG. 3, the geometric construct fitting module 142 uses the different arcs as identified by the length-angle plot for the component to determine the radius of each of the arcs. The beginning and ending points of an arc are determined based on the start points and end points of the proxies corresponding to the arc. For example, in one or more implementations, for each arc identified by the length-angle plot the beginning point of the arc is the start point of the proxy corresponding to the left-most horizontal line in the length-angle plot corresponding to the arc, and the ending point of the arc is the end point of the proxy corresponding to the right-most horizontal line in the length-angle plot corresponding to the arc. Additionally or alternatively, for each arc identified by the length-angle plot the beginning point of the arc is the end point of the proxy corresponding to the right-most horizontal line in the length-angle plot corresponding to the arc, and the ending point of the arc is the start point of the proxy corresponding to the left-most horizontal line in the length-angle plot corresponding to the arc.

The radius of each arc is determined by finding a circle that is a best fit through the midpoints of the proxies corresponding to the arc. Any of a variety of public or proprietary techniques for finding a best fit circle can be used to determine the radius of the arc given the midpoints of the arc.

The geometric construct fitting module 142 generates geometric constructs including straight lines and arcs. The straight lines are straight lines (or line segments) ranging from the start points to the end points of the proxies corresponding to horizontal lines of the length-angle plot that are not part of an arc. The arcs are the arcs determined by the geometric construct fitting module 142. It should be noted that the geometric construct fitting module 142 can also identify circles (e.g., if an arc has the same beginning point and ending point). The geometric construct fitting module 142 outputs these geometric constructs as geometric construct set 316. In one or more implementations, the geometric construct generation system 316 is a vector representation of the straight lines and arcs that make up the components of the sketch.

The geometric construct fitting module 142 generates a single geometric construct for each collection of one or more proxies that make up an arc, straight line, or circle. The arc, straight line, or circle is treated as a whole—different geometric constructs need not be generated for different parts of the arc, straight line, or circle. For example, two separate geometric constructs for the inner and outer parts of a curve are not generated.

Furthermore, the geometric construct fitting module 142 generates an enclosed shape even if there are gaps in the raster representation 302 of the sketch (e.g., there are gaps of a few pixels between two lines in the raster representation 302). The proxies can include gaps as discussed above. Thus, the geometric constructs that are straight lines range from the start point to the end point of a proxy and can ignore the presence of gaps in the raster representation 302. Similarly, the geometric constructs that are arcs or circles range from the start point to the end point of a proxy and can ignore the presence of gaps in the raster representation 302.

The output module 144 implements functionality to output the vector representation of the sketch. This vector representation of the sketch is an abstracted version 318 of the sketch. The output module 144 can output the abstracted version 318 in a variety of different manners, such as by displaying the abstracted version 318, storing the abstracted version in a local or remote storage device, transmitting the abstracted version 318 to another device or system, making the abstracted version 318 available to a digital content editing system, and so forth.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-9.

Figure 10:
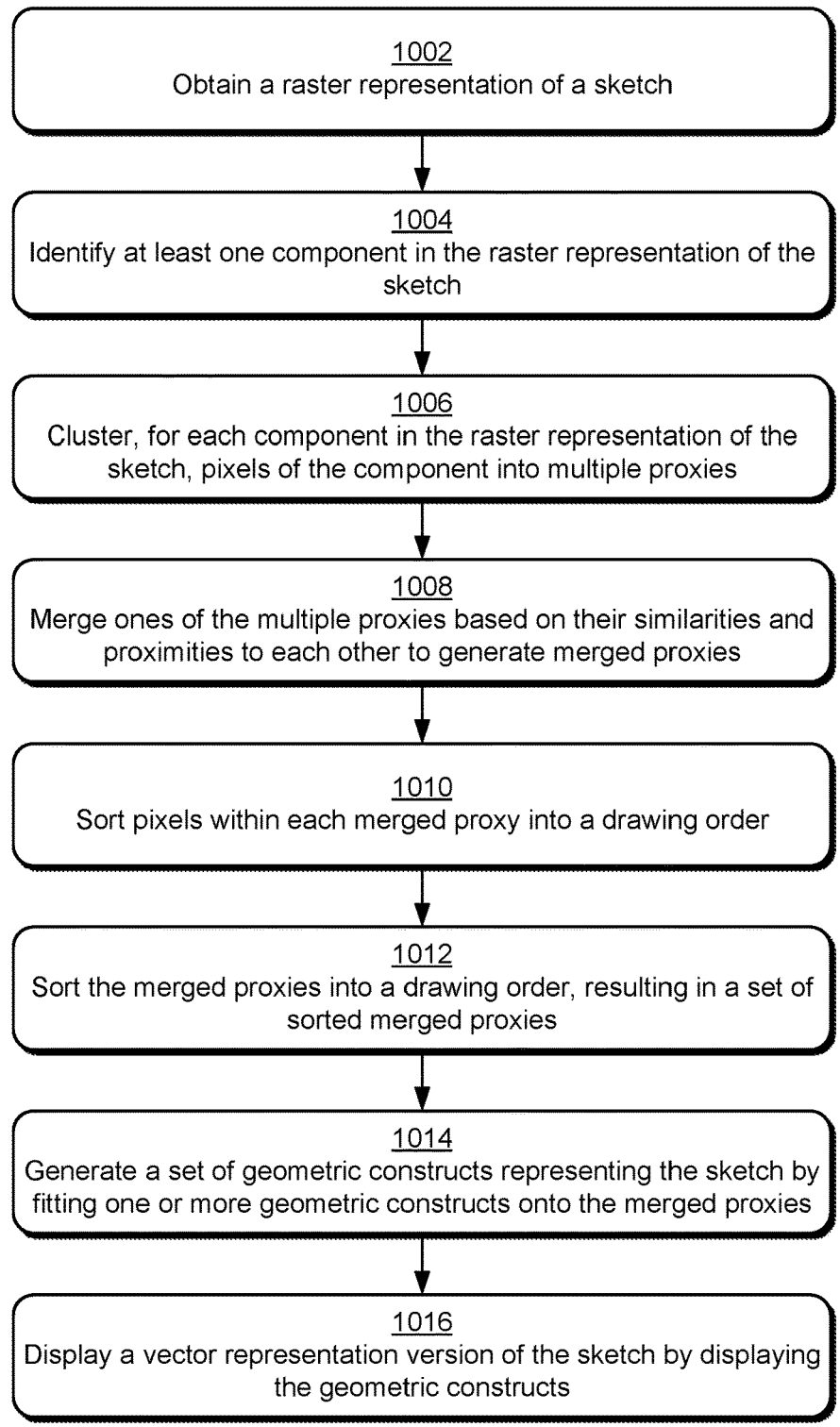
FIG. 10 is a flow diagram depicting a procedure in an example implementation of detecting salient geometric constructs from raster representations of sketches.

FIG. 10 is a flow diagram 1000 depicting a procedure in an example implementation of detecting salient geometric constructs from raster representations of sketches. In this example, a raster representation of a sketch is obtained (block 1002). The raster representation of the sketch can be obtained from various sources, such as from another device or system, generated from a captured image of the sketch, and so forth.

At least one component in the raster representation of the sketch is identified (block 1004). Each component in the raster representation of the sketch can be identified in various manners, such as by using a neighborhood graph of pixels and identifying connected components.

For each component in the raster representation of the sketch, pixels of the component are clustered into multiple proxies (block 1006). Each proxy includes multiple pixels that are different than the pixels included in other proxies.

Ones of the multiple proxies are merged based on their similarities and proximities to each other (block 1008). This results in multiple merged proxies, with the count of merged proxies for a component being less than the count of proxies for the component generated in block 1006.

Pixels within each merged proxy are sorted into a drawing order of the merged proxy (block 1010). The drawing order of the merged proxy refers to an order in which a user would typically sketch or draw the pixels in the proxy.

The merged proxies within each component are also sorted into a drawing order of the component (block 1012). The drawing order of the component refers to an order in which a user would typically sketch or draw the component. The result of blocks 1010 and 1012 is a set of sorted merged proxies.

A set of geometric constructs that represent the sketch is generated by fitting one or more geometric constructs onto the sorted merged proxies (block 1014). The geometric constructs include, for example, arcs (which may be portions of circles or full circles) and straight lines.

A vector representation of the sketch is output (block 1016). The vector representation can be output in various manners, such as displaying the set of geometric constructs, storing the vector representation of the sketch, transferring the vector representation of the sketch to another device or system, and so forth.

Example System and Device

Figure 11:
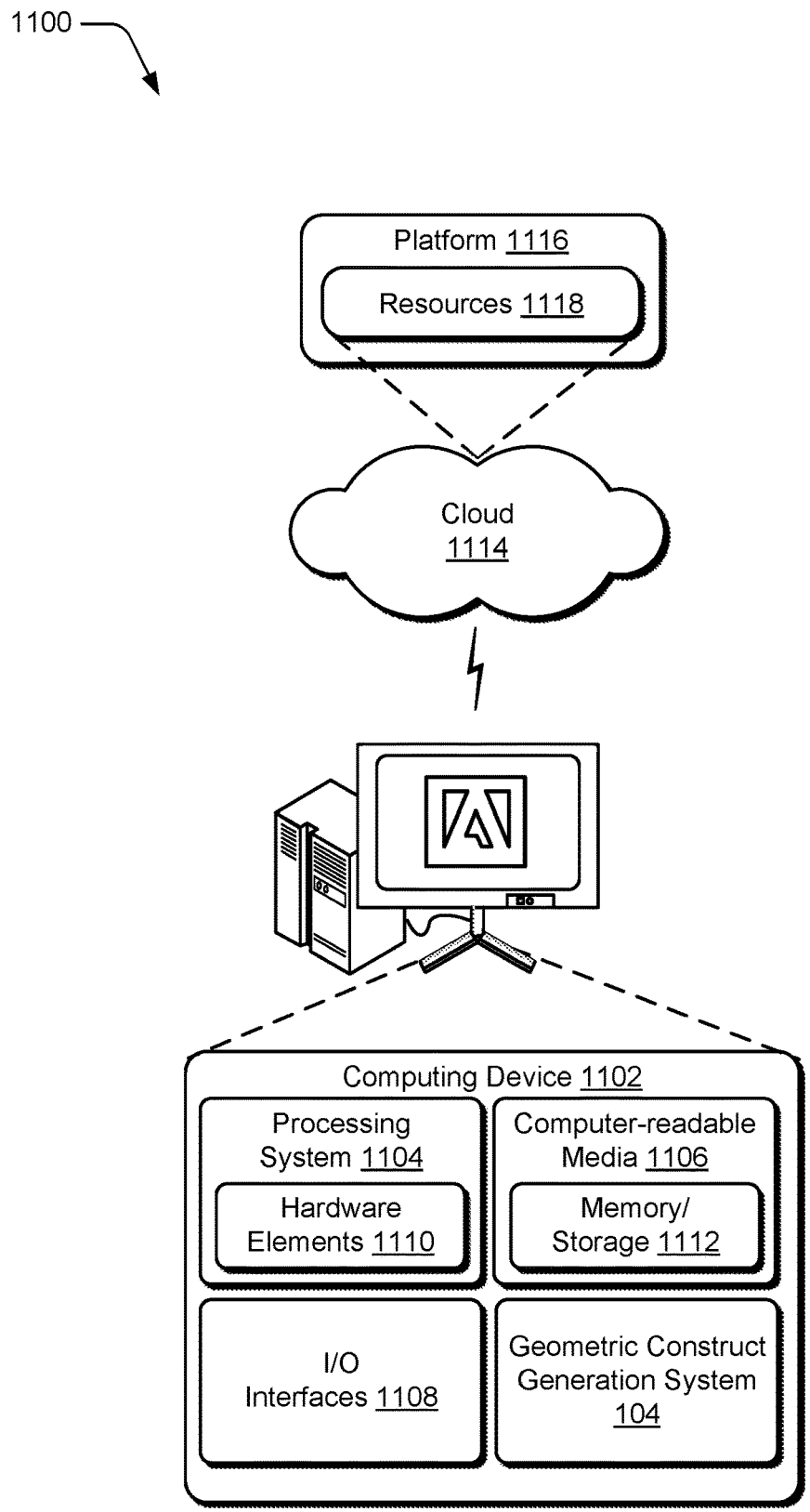
FIG. 11 illustrates an example system including various components of an example device that can be implemented as any type of computing device as described and/or utilize with reference to FIGS. 1-10 to implement aspects of the techniques described herein.

FIG. 11 illustrates an example system generally at 1100 that includes an example computing device 1102 that is representative of one or more computing systems and/or devices that may implement the various techniques described herein. This is illustrated through inclusion of the geometric construct generation system 104. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to detect salient geometric constructs from a raster representation of a sketch, a method implemented by at least one computing device, the method comprising:

identifying, by the at least one computing device, at least one component in a raster representation of a sketch;

clustering, by the at least one computing device for each component in the raster representation of the sketch, pixels of the component into multiple proxies, each proxy including multiple pixels, the clustering including:

assigning seed locations for each of multiple proxies, the seed location for each of the multiple proxies being a different pixel of the component, the pixel of the component at the seed location being assigned to one of the multiple proxies, and growing the multiple proxies by adding pixels of the component to the multiple proxies;

merging, by the at least one computing device, ones of the multiple proxies based on their similarities and proximities to each other, resulting in multiple merged proxies;

sorting, by the at least one computing device for each component in the raster representation of the sketch and responsive to the multiple proxies being merged for the component, pixels within each of the multiple merged proxies as well as merged proxies within the component into a drawing order, resulting in a set of sorted merged proxies;

generating, by the at least one computing device, a set of geometric constructs representing the sketch by fitting one or more geometric constructs onto the sorted merged proxies; and displaying, by the at least one computing device responsive to the set of geometric constructs being generated, a vector representation of the sketch by displaying the set of geometric constructs.

2. The method as recited in claim 1, the clustering including, for each component in the raster representation of the sketch:
estimating a number of proxies to include in multiple proxies for the component; and
performing multiple iterations of the assigning seed locations for the multiple proxies and the growing the multiple proxies.

3. The method as recited in claim 2, the assigning seed locations including:
in an initial iteration of the multiple iterations,
assigning a first seed location to a first proxy of the multiple proxies randomly or pseudorandomly,
assigning, to additional proxies of the multiple proxies, a seed location that is furthest from all seed location previously assigned in the initial iteration; and in a subsequent iteration of the multiple iterations,
assigning, to each of the multiple proxies, a seed location that is a centroid of the proxy.

4. The method as recited in claim 2, further comprising, in a current iteration of the multiple iterations:
adding, each time a pixel is assigned to one of the multiple proxies, to a subset of the multiple pixels neighboring pixels of the pixel that have not been assigned to one of the multiple proxies in the current iteration;
identifying, for each pixel in the subset, a cost of assigning the pixel to a neighboring proxy of the pixel, the neighboring proxy comprising one of the multiple proxies; and
assigning one pixel of the subset to a neighboring proxy of the one pixel, the one pixel having a lowest cost of being assigned to a neighboring proxy of the pixel.

5. The method as recited in claim 1, the merging comprising:
merging two neighboring proxies in the multiple proxies of a component in response to the normals of two proxies being within a threshold amount of one another as well as average errors between the proxy normal and local normals of pixels in the proxy being within a threshold amount of one another.

6. The method as recited in claim 1, the merging comprising:
merging a first proxy with a second proxy neighboring the first proxy in response to the first proxy having less than a threshold number of pixels and the second proxy having at least the threshold number of pixels.

7. The method as recited in claim 1, the sorting pixels within each of the multiple merged proxies comprising:
identifying each pixel in the merged proxy as being included in a set of unsorted pixels;
selecting an initial pixel within the merged proxy having a highest number of neighboring pixels that are included in other merged proxies;
adding the initial pixel to a set of sorted pixels;
identifying, for each pixel in the set of unsorted pixels, a cost of adding the pixel to the set of sorted pixels;
for the one pixel having a lowest cost of being added to the set of sorted pixels:
adding the one pixel to the set of sorted pixels, and
removing the one pixel from the set of unsorted pixels;
repeating the identifying the cost, the adding, and the removing for each pixel in the set of unsorted pixels; and
maintaining, as a drawing order of the pixels within the merged proxy, a record of the order in which pixels are added to the set of sorted pixels.

8. The method as recited in claim 1, the set of geometric constructs including a set of one or more arcs and one or more straight line segments.

9. In a digital medium environment to detect salient geometric constructs from a raster representation of a sketch, a computing device comprising:
a processor; and
computer-readable storage media having stored thereon multiple instructions that, responsive to execution by the processor, cause the processor to perform operations including:
identifying at least one component in a raster representation of a sketch;
generating multiple proxies for each component in the raster representation of the sketch by clustering the pixels of the component into groups, the clustering including:
assigning seed locations for each of multiple proxies, the seed location for each of the multiple proxies being a different pixel of the component, the pixel of the component at the seed location being assigned to one of the multiple proxies, and
growing the multiple proxies by adding pixels of the component to the multiple proxies;
generating multiple merged proxies by merging ones of the multiple proxies based on their similarities and proximities;
sorting, for each merged proxy of the multiple merged proxies, pixels within the merged proxy into a drawing order;
sorting, for each component in the raster representation of the sketch, the merged proxies within the component into a drawing order, resulting in a set of sorted merged proxies;
generating a set of geometric constructs representing the sketch by fitting one or more geometric constructs onto the sorted merged proxies; and
displaying, responsive to the set of geometric constructs being generated, a vector representation of the sketch by displaying the set of geometric constructs.

10. The computing device as recited in claim 9, the generating multiple proxies including, for each component in the raster representation of the sketch:
estimating a number of proxies to include in multiple proxies for the component; and
performing multiple iterations of the assigning seed locations for the multiple proxies and the growing the multiple proxies by adding pixels of the component to the multiple proxies.

11. The computing device as recited in claim 10, the assigning seed locations including:
in an initial iteration of the multiple iterations,
assigning a first seed location to a first proxy of the multiple proxies randomly or pseudorandomly,
assigning, to additional proxies of the multiple proxies, a seed location that is furthest from all seed location previously assigned in the initial iteration; and
in a subsequent iteration of the multiple iterations, assigning, to each of the multiple proxies, a seed location that is a centroid of the proxy.

12. The computing device as recited in claim 10, the operations further including, in a current iteration of the multiple iterations:
adding, each time a pixel is assigned to one of the multiple proxies, to a subset of the multiple pixels neighboring pixels of the pixel that have not been assigned to one of the multiple proxies in the current iteration;
identifying, for each pixel in the subset, a cost of assigning the pixel to a neighboring proxy of the pixel, the neighboring proxy comprising one of the multiple proxies; and
assigning one pixel of the subset to a neighboring proxy of the one pixel, the one pixel having a lowest cost of being assigned to a neighboring proxy of the pixel.

13. The computing device as recited in claim 9, the generating multiple merged proxies comprising:
merging two neighboring proxies in the multiple proxies of a component in response to the normals of two proxies being within a threshold amount of one another as well as average errors between the proxy normal and local normals of pixels in the proxy being within a threshold amount of one another.

14. The computing device as recited in claim 9, the generating multiple merged proxies comprising:
merging a first proxy with a second proxy neighboring the first proxy in response to the first proxy having less than a threshold number of pixels and the second proxy having at least the threshold number of pixels.

15. The computing device as recited in claim 9, the sorting pixels within the multiple merged proxy comprising:
identifying each pixel in the merged proxy as being included in a set of unsorted pixels;
selecting an initial pixel within the merged proxy having a highest number of neighboring pixels that are included in other merged proxies;
adding the initial pixel to a set of sorted pixels;
identifying, for each pixel in the set of unsorted pixels, a cost of adding the pixel to the set of sorted pixels;
for the one pixel having a lowest cost of being added to the set of sorted pixels:
adding the one pixel to the set of sorted pixels, and removing the one pixel from the set of unsorted pixels;
repeating the identifying the cost, the adding, and the removing for each pixel in the set of unsorted pixels; and
maintaining, as a drawing order of the pixels within the merged proxy, a record of the order in which pixels are added to the set of sorted pixels.

16. The computing device as recited in claim 9, the set of geometric constructs including a set of one or more arcs and one or more straight line segments.

17. A system comprising:
a component identification module to identify at least one component in a raster representation of a sketch;
means for generating multiple merged proxies for each component in the raster representation of the sketch, one or more of the merged proxies including multiple pixels from multiple different proxies combined based on their similarities and proximities to each other, wherein the means for generating multiple merged proxies assigns seed locations for the multiple proxies, the seed location for each of the multiple proxies being a different pixel of the component, the pixel of the component at the seed location being assigned to one of the multiple proxies and grows the multiple proxies by adding pixels of the component to the multiple proxies;
means for sorting pixels within each of the multiple merged proxies as well as merged proxies into a drawing order, resulting in a set of sorted merged proxies;
a geometric construct fitting module to generate a set of geometric constructs representing the sketch by fitting one or more geometric constructs onto the sorted merged proxies; and
an output module to display, by the at least one computing device, a vector representation of the sketch by displaying the set of geometric constructs.

18. The system as recited in claim 17, wherein the means for generating multiple merged proxies, for each component in the raster representation of the sketch:
estimates a number of proxies to include in multiple proxies for the component; and
performs multiple iterations of the assigning seed locations for the multiple proxies and the growing the multiple proxies.

19. The system as recited in claim 18, the assigning seed locations including:
in an initial iteration of the multiple iterations,
assigning a first seed location to a first proxy of the multiple proxies pseudorandomly,
assigning, to additional proxies of the multiple proxies, a seed location that is furthest from all seed location previously assigned in the initial iteration; and
in a subsequent iteration of the multiple iterations,
assigning, to each of the multiple proxies, a seed location that is a centroid of the proxy.

20. The system as recited in claim 17, the set of geometric constructs including a set of one or more arcs and one or more straight line segments.

* * * * *